C. AALBORG.
ELECTRICAL SWITCH.
APPLICATION FILED DEC. 6, 1907.

1,070,935.

Patented Aug. 19, 1913.
4 SHEETS—SHEET 3.

WITNESSES:
C. L. Belcher
Otto S. Schairer

INVENTOR
Christian Aalborg
BY
ATTORNEY

C. AALBORG.
ELECTRICAL SWITCH.
APPLICATION FILED DEC. 6, 1907.
1,070,935.
Patented Aug. 19, 1913.
4 SHEETS—SHEET 4.
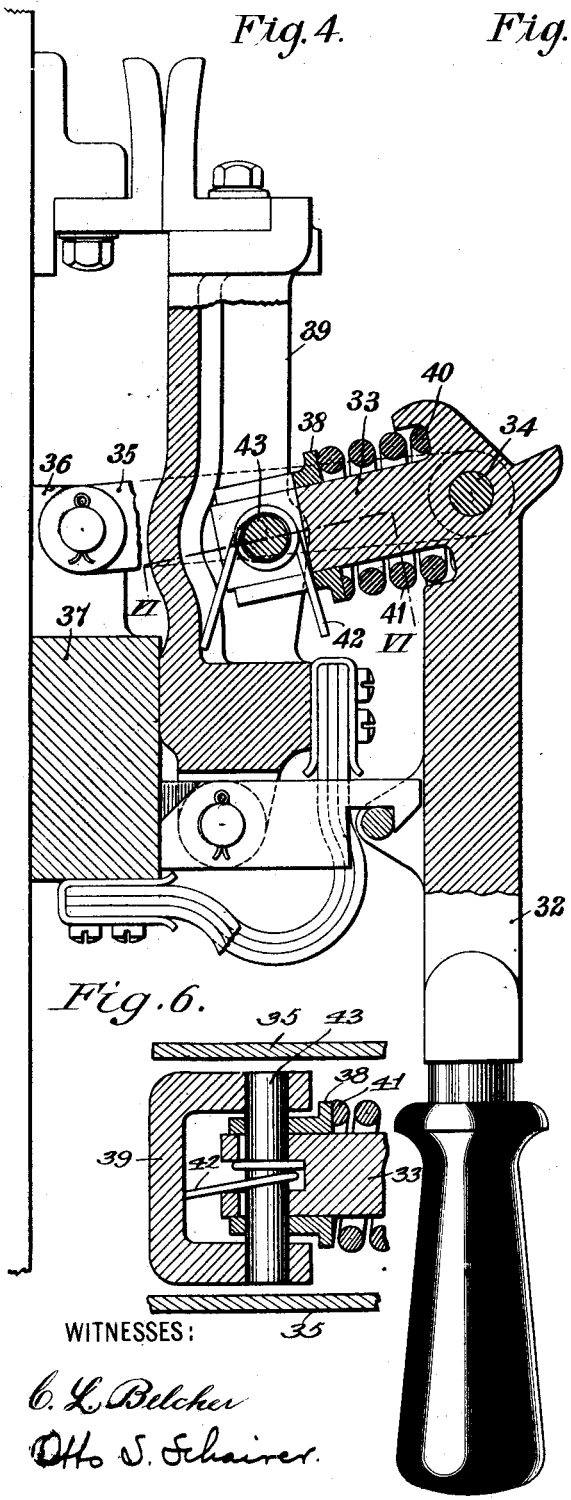
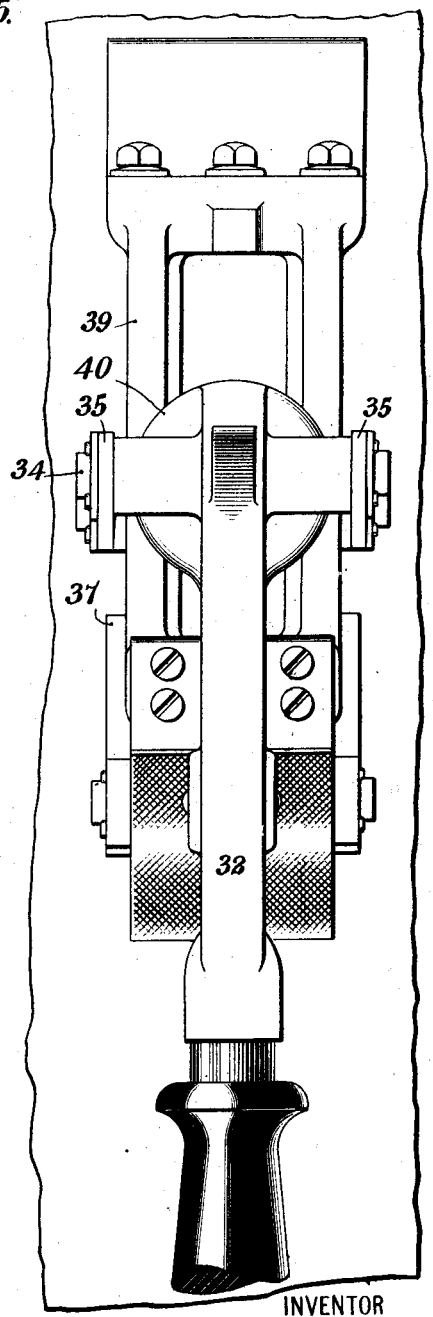
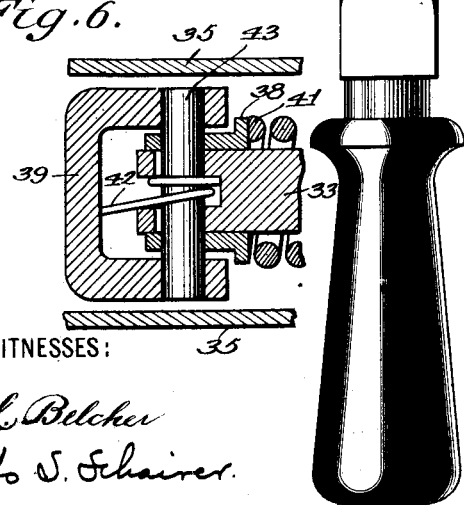
WITNESSES:
C. L. Belcher
Otto J. Schairer
INVENTOR
Christian Aalborg
BY
Wesley G. Carr
ATTORNEY

UNITED STATES PATENT OFFICE.

CHRISTIAN AALBORG, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRICAL SWITCH.

1,070,935.     Specification of Letters Patent.     Patented Aug. 19, 1913.

Application filed December 6, 1907. Serial No. 405,406.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Electrical Switches, of which the following is a specification.

My invention relates to manually operated electrical switches, and it has for its object to provide a switch having solid contact faces that shall have high current-carrying capacity and be simple in construction and economical to manufacture.

Electrical switches and circuit breakers having relatively high current-carrying capacities have usually been provided with laminated terminal members to insure good electrical contact between the engaging parts, but such devices have been structurally complicated and expensive to manufacture.

In order to simplify the structure and reduce the cost of manufacture of switches, I employ solid contact members, and, in order to obtain relatively high current-carrying capacities, I cause very high pressures to be resiliently applied to the said contact members when the switches are closed.

Figure 1:
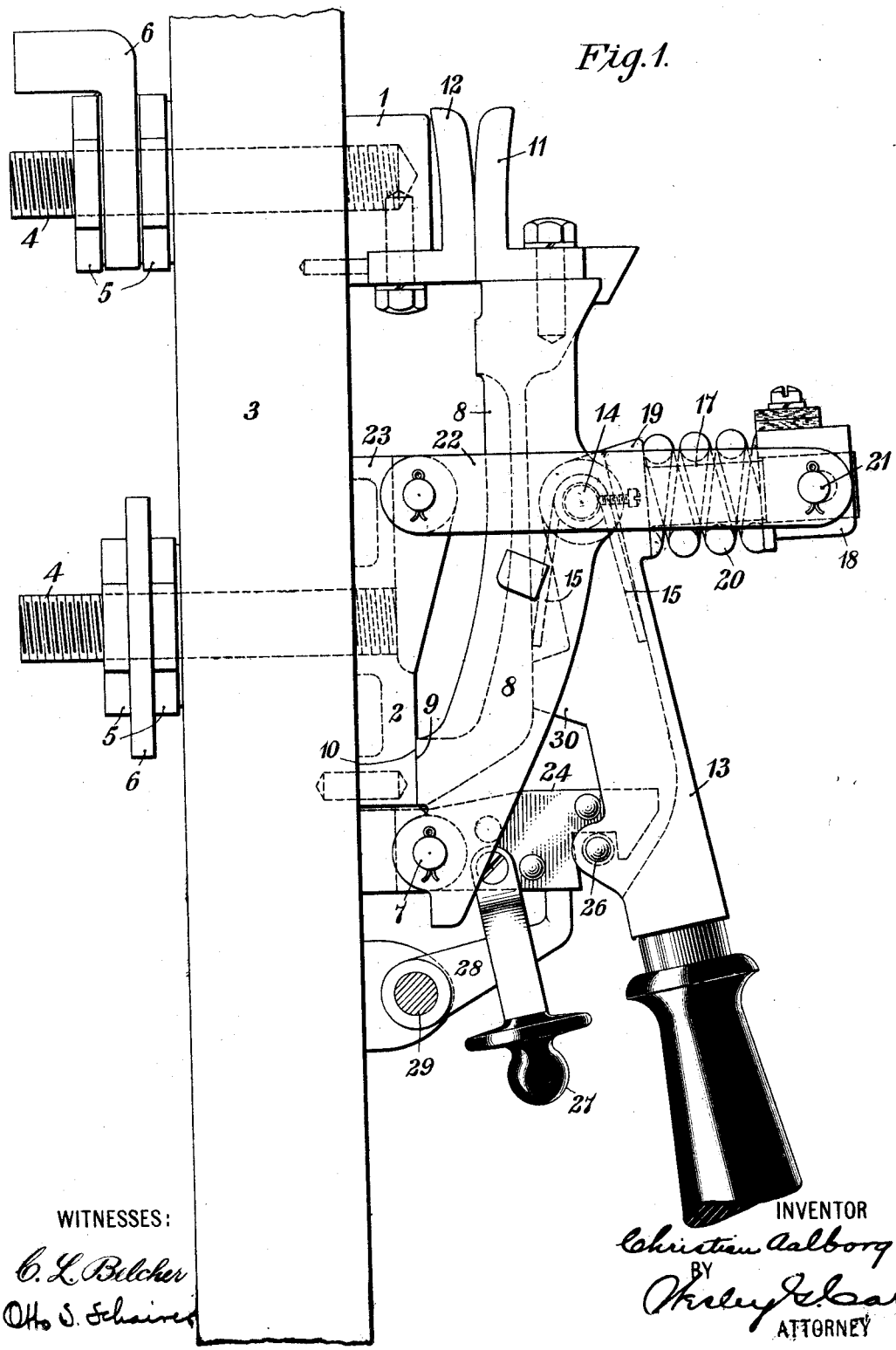
Figure 2:
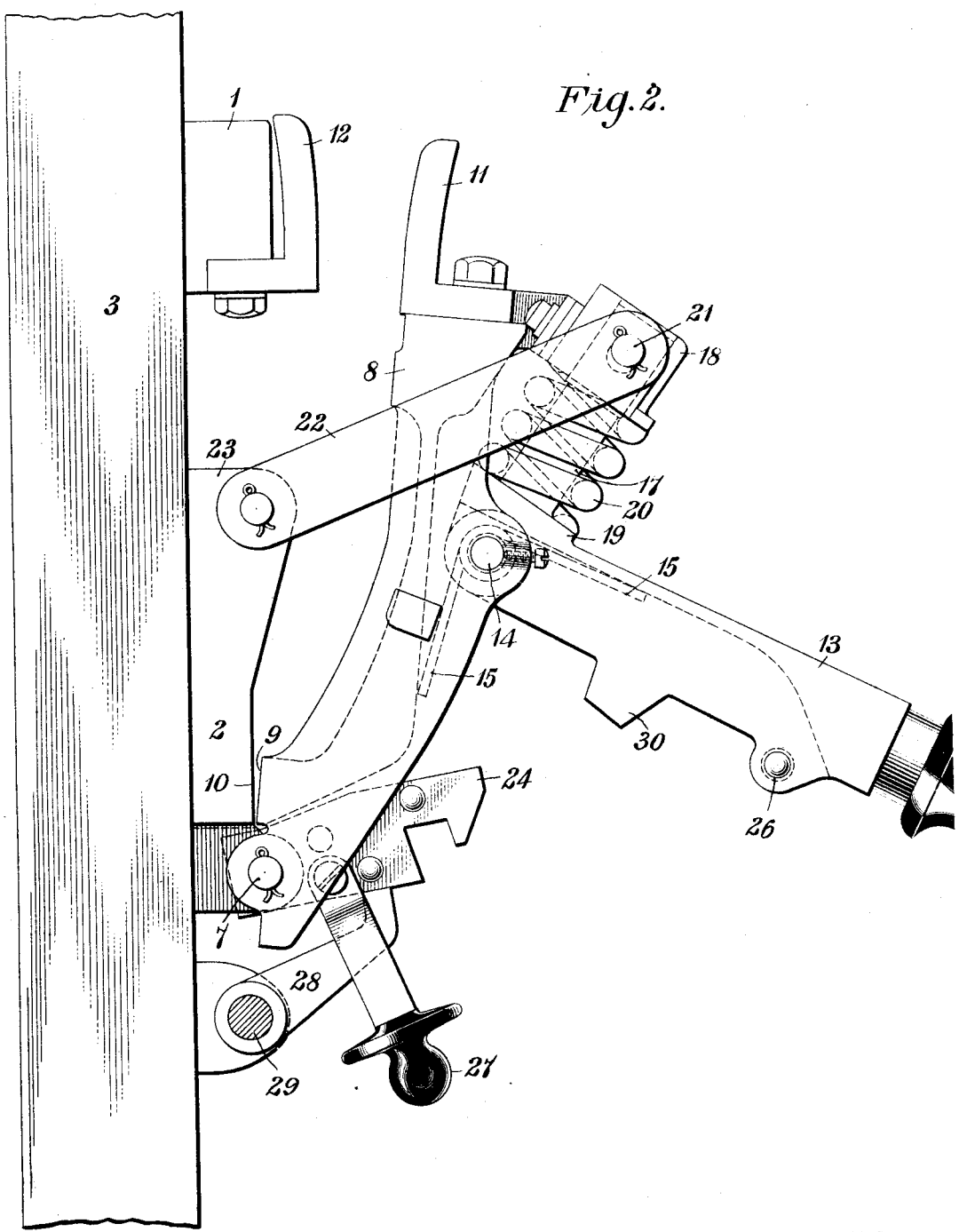
Figure 3:
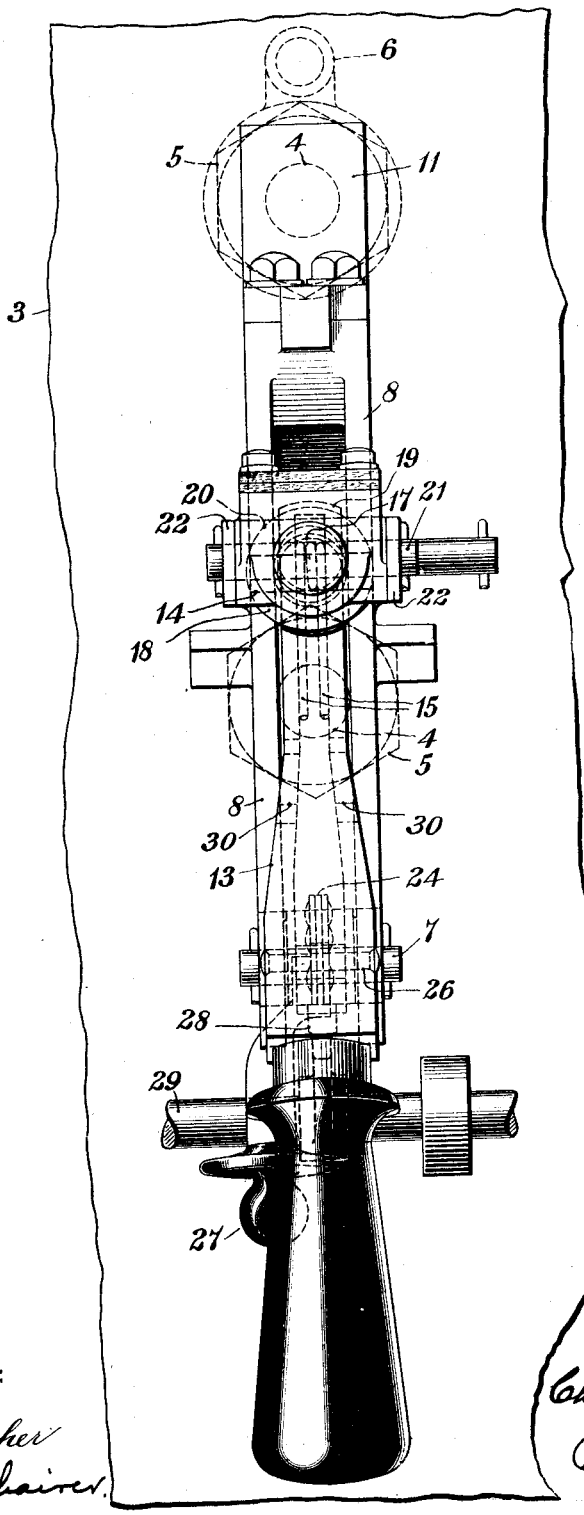

My invention is illustrated in the accompanying drawings, Figure 1 of which is a view, in side elevation, of a switch constructed in accordance therewith, and in closed position. Fig. 2 is a view, in side elevation, of the switch of Fig. 1, in open position. Fig. 3 is a view, in front elevation, of the switch of Figs. 1 and 2. Fig. 4 is a sectional view, partially in side elevation. Fig. 5 is a view, in front elevation, of a modified form of the switch. Fig. 6 is a sectional view on the line VI—VI of Fig. 4.

Stationary terminal members 1 and 2 of the switch are secured to the front face of a suitable supporting panel 3 by means of stud bolts 4 that project through the panel and are provided at their rear ends with nuts 5 between which are clamped terminals 6 to be secured to circuit conductors. Pivotally secured to the lower end of the stationary terminal member 2 by means of a pin 7, is a webbed arm 8 having a contact face 9 adapted to engage a corresponding face 10 upon the terminal member 2 and provided, at its upper free end, with a slightly rounded detachable contact piece 11 adapted to engage a similarly shaped stationary contact piece 12 with which the terminal member 1 is provided. The opening in the lower end of the arm 8, in which the pivot pin 7 is located, is of somewhat larger diameter than the pivot pin in order that a loose pivotal support for the arm may be provided which will not interfere with free and perfect engagement between the contact faces 9 and 10, it being intended that current shall pass from the arm 8 to the terminal member 2 through the contact faces 9 and 10 rather than through the pivotal support for the arm. The arm 8 is operated by means of a lever 13 pivotally connected thereto by means of a pin 14 surrounding which is a helical torsion spring 15 that tends to effect relative rotation of the arm and the lever 13 about the pivot pin 14 to open the switch. The operating lever 13 has an arm 17 that projects at an angle of nearly 90° from the body portion of the lever and the outer end of which is movably seated in a guide-block 18, a strong helical compression spring 20 being interposed between said block and a shoulder 19 upon the body portion of the lever. The guide-block 18 is pivotally connected to the outer ends of two links 22 by means of a pin 21 which also extends through a slot in the end of the arm 17 of the lever, said links being disposed upon opposite sides of the arm 8 and their inner ends being pivotally secured to an extension 23 of the terminal member 2.

The switch is retained in closed position by means of a trigger 24 that is pivotally mounted upon the pin 7 and is provided, at its free end, with a hook that is adapted to engage a pin 26 carried by the operating lever 13. The trigger 24 may be operated by a handle 27 to disengage it from the pin 26, in order to permit the switch to open. The trigger may also be disengaged from the pin 26 by a dog 28, that is mounted upon a shaft 29 and may be operated, either manually or automatically, upon the occurrence of predetermined conditions, by any suitable means (not shown).

In order to close the switch, the operating lever 13 is moved from the position shown in Fig. 2 toward the position shown in Fig. 1, whereupon the arm 8 will be rotated about the pivot pin 7 until the contact piece 11 engages the contact piece 12 after which the contact face 9 will be caused to engage the contact face 10, a comparatively free adjustment of the stationary and movable engaging parts being permitted by reason of the loose pivotal support for the arm 8. Further movement of the operating lever 13 causes the arm 17 thereof to slide in the guide-block 18 and effect compression of the spring 20, the pressure exerted by said spring being applied to the engaging contact faces of the switch, and, when the switch is completely closed, this pressure is of such degree that the resistance to the passage of current between the engaging members of the switch is materially reduced and the switch is thereby provided with a relatively high current-carrying capacity. When the switch is completely closed, the trigger 24 engages the pin 26 carried by the operating lever 13 and retains the lever in the position shown in Fig. 1. In order to prevent injury to the trigger 24 by movement of the operating lever 13 beyond the position shown in Fig. 1 a lug 30 is provided upon the inner side of the operating lever that engages the arm 8 in the bottom of the channel between the webbed sides thereof.

In the switch of Figs. 1, 2, and 3 the arm 17 of the operating lever projects outwardly away from the face of the panel 3, but in the switch of Figs. 4 and 5 an operating lever 32 is provided with an arm 33 that extends inwardly toward the panel upon which the switch is mounted, the operating lever, in this instance, being pivotally connected, by a pin 34, to the outer ends of links 35 the inner ends of which are pivotally connected to an extension 36 of a stationary contact terminal 37. The arm 33 of the operating lever operates in a guide-block 38 which is pivotally connected to contact-carrying arm 39 and between which and a seat 40 upon the operating lever, a spring 41 is interposed, said spring being for the purpose of causing a very high pressure to be exerted between the engaging contact terminals of the switch. A helical spring 42 surrounds the pivot pin 43 whereby the guide-block 38 is connected to contact-carrying arm 39 and serves, as does the spring 15 of the switch of Figs. 1, 2, and 3, to cause the initial opening movement of the switch when the operating lever is released. The switch of Figs. 4, 5 and 6 differs from that of Figs. 1, 2, and 3 in its structural details, but its mode of operation is substantially the same and it serves to illustrate one of the many structural modifications that may be made within the spirit and scope of my invention.

I claim as my invention:

1. In an electric switch, the combination with stationary terminal members, and a loosely pivoted arm carrying solid non-resilient contact members which are adapted to engage the respective stationary terminal members, of a lever for moving said arm to circuit-closing position and a spring which is compressed by said lever and acts upon said arm at a point between said contact members.

2. An electric switch comprising a loosely pivoted contact-carrying arm, an operating lever pivotally connected thereto, a guide-block on the said lever, a spring interposed between the guide-block and a seat upon the lever, and an arm pivotally connected at one end to a stationary member and at the other end to the guide-block.

3. An electric switch comprising a loosely pivoted contact-carrying arm, an operating lever pivotally connected thereto, a guide-block on the said lever, a spring interposed between the guide-block and a shoulder upon the lever, an arm pivotally connected at one end to a stationary member and at the other end to the guide-block, means for retaining the switch in closed position, and a spring for causing the initial opening of the switch when released by the said retaining means.

4. An electric switch comprising a loosely pivoted contact-carrying arm, an operating lever therefor, an arm with which the operating lever has a sliding pivotal connection, and resilient means interposed between a seat upon the operating lever and the said sliding pivotal connection.

5. In an electric switch, the combination with a contact-carrying arm, and toggle lever operating mechanism therefor comprising a sliding pivotal connection between its members, of resilient means interposed between the said sliding pivotal connection and the operating lever.

6. In an electric switch, the combination with a contact-carrying arm, toggle lever operating mechanism therefor comprising a sliding pivotal connection between its members, and resilient means interposed between the said sliding pivotal connection and the operating lever, of means for retaining the switch in closed position, and resilient means for effecting an initial opening movement of the switch when released by the said retaining means.

7. An electric switch comprising a contact-carrying arm, an operating lever pivotally connected thereto, a stationarily pivoted link also pivotally connected to the operating lever, means for permitting adjustment of the distance between the pivotal connections of the operating lever to the contact-carrying arm and to the link, and resilient means normally tending to lengthen the said distance.

8. An electric switch comprising a contact-carrying arm, an operating lever pivotally connected thereto, a stationarily pivoted link also pivotally connected to the said operating lever, a guide-block upon the operating lever forming a part of one of the pivotal connections to the operating lever, and resilient means interposed between the guide-block and a seat upon the operating lever.

9. An electric switch comprising a loosely pivoted contact-carrying arm, an operating lever pivotally connected thereto, a stationarily pivoted arm also pivotally connected to the operating lever, a guide-block forming a part of one of the pivotal connections of the operating lever, and a compression spring surrounding the said lever and interposed between a seat thereon and the said guide-block.

In testimony whereof, I have hereunto subscribed my name this 26th day of Nov., 1907.

CHRISTIAN AALBORG.

Witnesses:
H. C. SOULE,
BIRNEY HINES.

Copies of this patent may be obtained for five cents each, by addressing the "Commissioner of Patents, Washington, D. C."